Oct. 7, 1958 W. G. MORGAN ET AL 2,855,054
SPEED CONTROL SYSTEM FOR REVERSIBLE
PITCH AIRCRAFT PROPELLERS
Filed Jan. 11, 1954 6 Sheets-Sheet 6

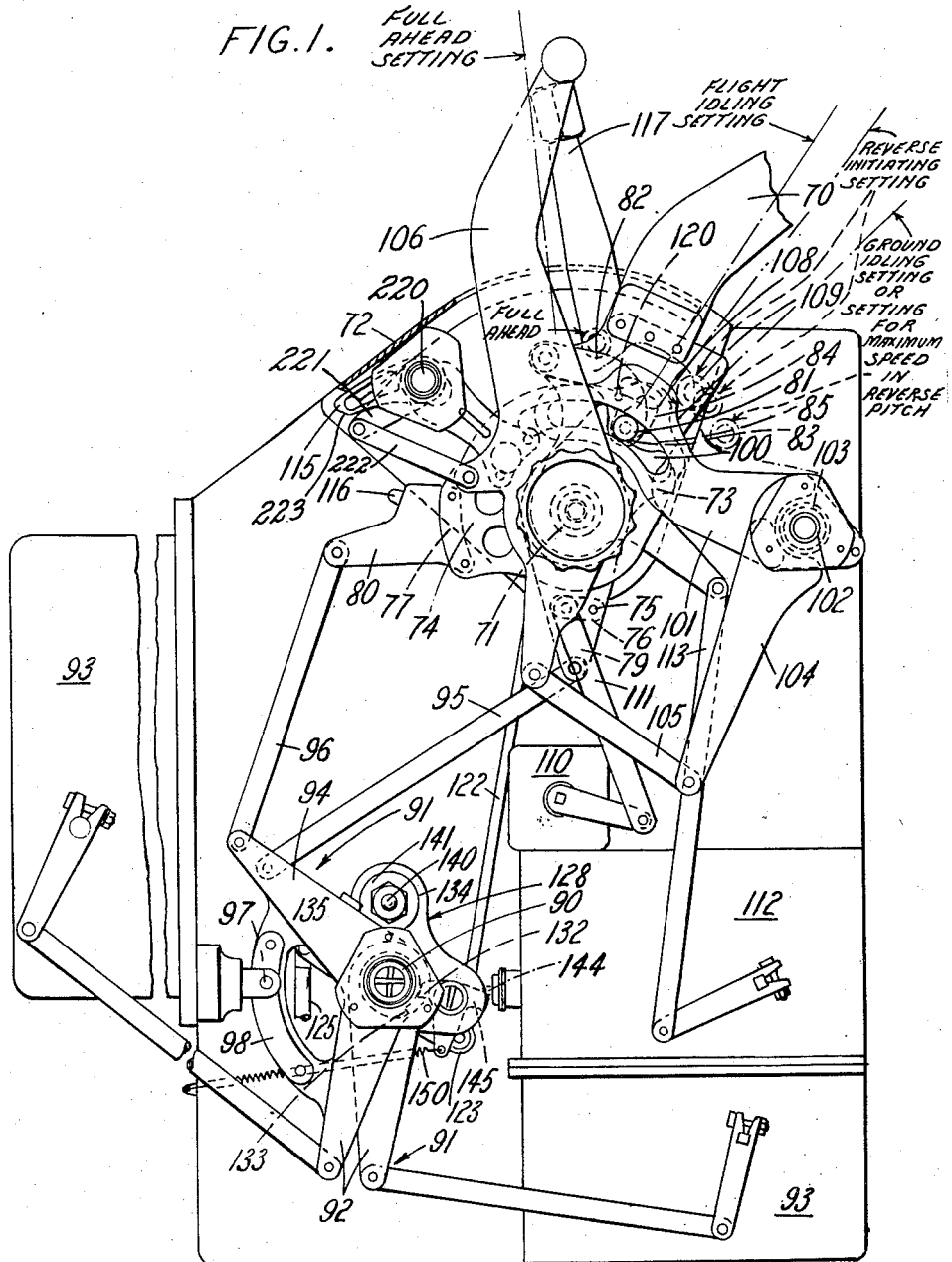

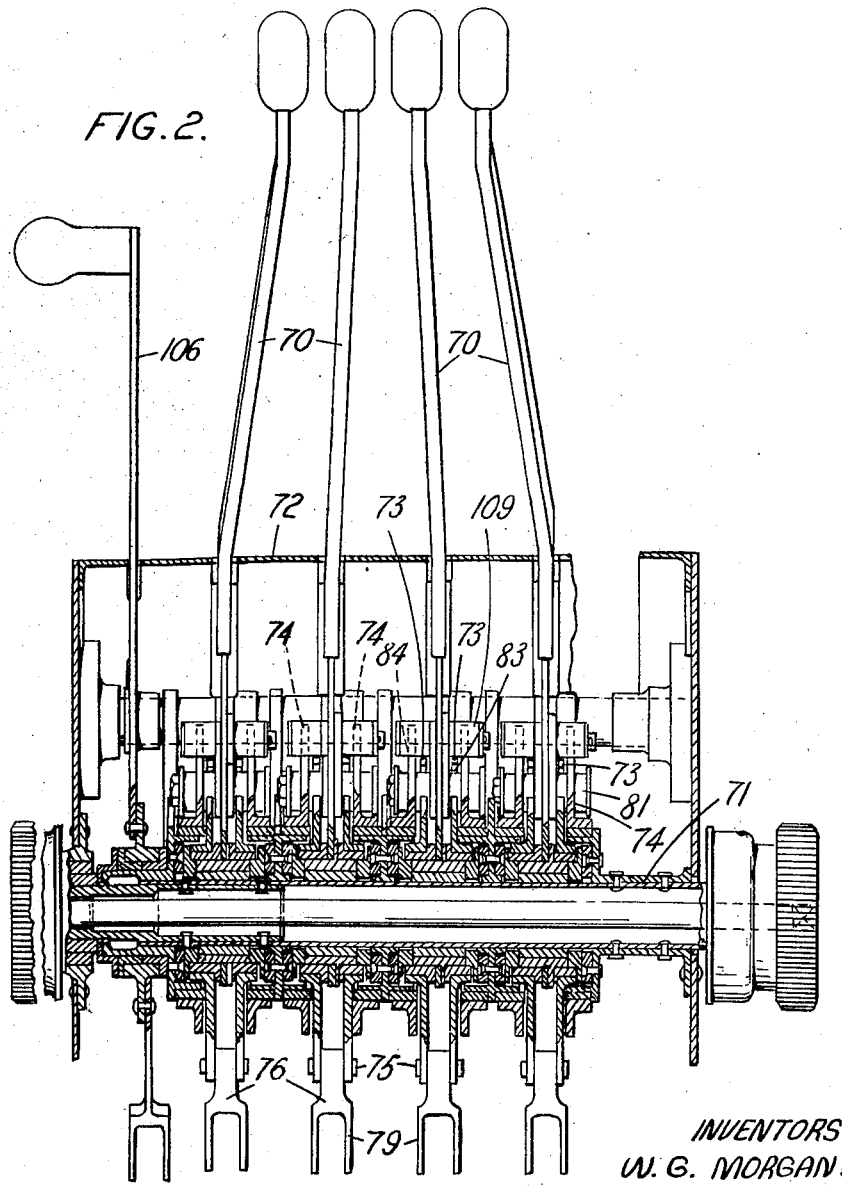

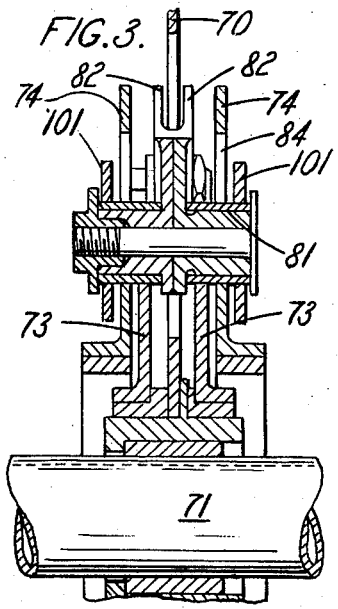

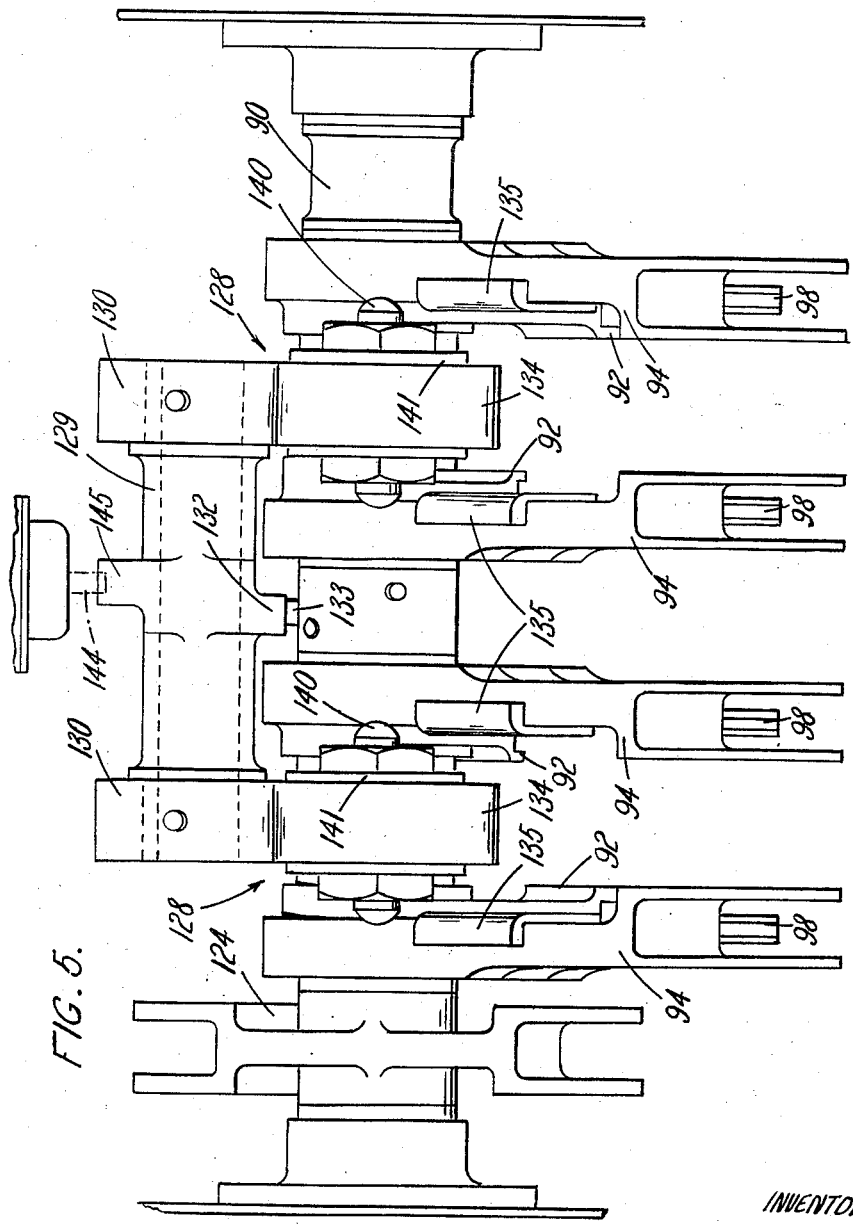

INVENTORS
W.G. MORGAN
A. SYMON
H.E.W. ROBINSON and
F. W. VERRIER

BY Mawhinney & Mawhinney
ATTORNEYS

2,855,054

SPEED CONTROL SYSTEM FOR REVERSIBLE PITCH AIRCRAFT PROPELLERS

William George Morgan, Alexander Symon, Harry Edgar William Robinson, and Frank William Verrier, Bristol, England, assignors, by mesne assignments, to Bristol Aircraft Limited, Bristol, England, a British company Application January 11, 1954, Serial No. 403,352

Claims priority, application Great Britain January 14, 1953

17 Claims. (Cl. 170—135.24)

This invention relates to a speed control system for a propulsion unit having a reversible pitch propeller, which speed control system is of the kind in which movement of a manual speed control lever, such as a throttle lever, in one direction from a reverse initiating setting speeds up the unit in positive pitch, for forward propulsion, and movement of the manual control lever in the other direction from said reverse initiating setting speeds up the unit in reverse pitch for braking. Generally, the control lever is pushed forward to speed up the unit in positive pitch and is pulled back to initiate braking, and such an arrangement is desirable in order to preserve the instinctiveness of the control movements applied to the speed control lever for changing from forward propulsion to braking and vice versa, By "reverse initiating setting" is meant the setting of the speed control lever in which movement of the propeller from positive pitch to reverse pitch is initiated.

Hitherto, in systems of the kind referred to above, the reverse initiating setting has been the minimum speed setting corresponding to the idling speed of the unit in forward pitch. This is usually undesirable, however, especially with aircraft, where the minimum speed setting corresponds to stopped ground idling conditions, since in passing through the minimum speed setting when going from forward propulsion to braking there is a greater danger of stalling the propulsion unit than if the reverse initiating setting corresponded to a higher speed setting of the unit than the desirable ground idling speed with the aircraft stationary.

With a view to overcoming this objection, the present invention provides a control system of the kind referred to, wherein said reverse initiating setting of the speed control lever corresponds to an intermediate speed of the unit in positive pitch, the lever being movable from said reverse initiating setting in one direction into a higher speed range in positive pitch, and in the other direction into a lower speed range in positive pitch, and wherein there is provided two propeller pitch reversal initiating means acting in combination to bring about the pitch reversal of the propeller, one said propeller pitch reversal means becoming automatically operative when the speed control lever is in its reverse initiating setting, and the other becoming operative when a separate manual control is moved to a reverse selecting position, returning means ensuring return to positive pitch of the propeller when the speed control lever is moved back through its reverse initiating setting from a setting in said lower speed range, means for maintaining reverse pitch once obtained while the speed control lever is in its said lower speed range, and speed control reversing means rendered effective by said separate manual control on movement to its reverse selecting position to reverse the action of the speed control lever on the unit when the speed control lever is moved from its reverse initiating setting to a position in said lower speed range so that the speed of the unit is increased instead of being reduced.

Preferably, the system further comprises means indicating a second intermediate setting of the speed control lever, said second intermediate setting being in said higher speed range immediately adjacent said reverse initiating setting, and corresponding to the operational idling speed of the unit.

The system is arranged so that the lowest setting to which the speed control lever is movable in said lower speed range corresponds to the stopped idling speed of the unit when reverse is not selected, and the maximum speed in reverse pitch when reverse is selected.

According to another feature of the invention the system may yet further comprise means which becomes effective upon said speed control lever, when said speed control lever is in its reverse initiating setting or in a setting in said lower speed range immediately adjacent said reverse initiating setting, and said separate manual control is in its reverse selecting position, to prevent inadvertent movement of the speed control lever to a setting in said lower speed range. In operation, the pilot may be required to pause at the reverse initiation setting sufficiently long to enable the propeller pitch to be reversed by servo means provided for that purpose in which case, the inadvertent movement preventing means may merely indicate the reverse initiating position of the speed control lever to the pilot. On the other hand, the inadvertent movement preventing means may be of a character positively to prevent further movement of the speed control lever until pitch reversal has proceeded sufficiently far to avoid the possibility of overspeeding when the speed control lever is moved. Preferably, the inadvertent movement preventing means is operatively connected to said separate manual control so as to be set for action when said separate manual control is moved to its reverse selecting position.

The invention may also be employed in installations comprising at least two propulsion units, having reversible pitch propellers, in which case a control system as previously defined is provided for each unit, the control systems having a common separate manual control for effecting pitch reversal. In such a combination of control systems, according to the invention, another feature of the invention provides as another element of the combination, a manual locking control for locking directional control devices pertaining to a vehicle which the units are intended to propel, said manual locking control being arranged, when moved to a controls locked position, to interpose a device in the paths or parts moved by the speed control levers of the speed control systems pertaining to the propulsion units, which device is effective to prevent movement of all of the speed control levers simultaneously to a setting above a setting corresponding to a predetermined speed of each unit, but allows movement of any speed control lever singly to such a setting.

One embodiment of the present invention will now be described by way of example. The control system which is about to be described is for an aircraft having four propulsion units, the control system for each unit being identical, and the systems having a common separate manual reversing control, and being provided in combination with a manual locking control for locking the directional control devices of the aircraft.

In the accompanying drawings:

Figure 1 shows the multi-control system in side elevation, with an end plate removed, Figure 2 is a front elevation, in cross-section showing part of the control system shown in Figure 1, Figures 3 and 6 are partial views in cross-section showing certain details of construction of the system more clearly, Figure 4 is a part of Figure 1 to a larger size and showing further details of construction, and Figure 5 is a plan view of the part of the system shown in Figure 4, certain parts having been omitted for the sake of clarity.

Figure 7:
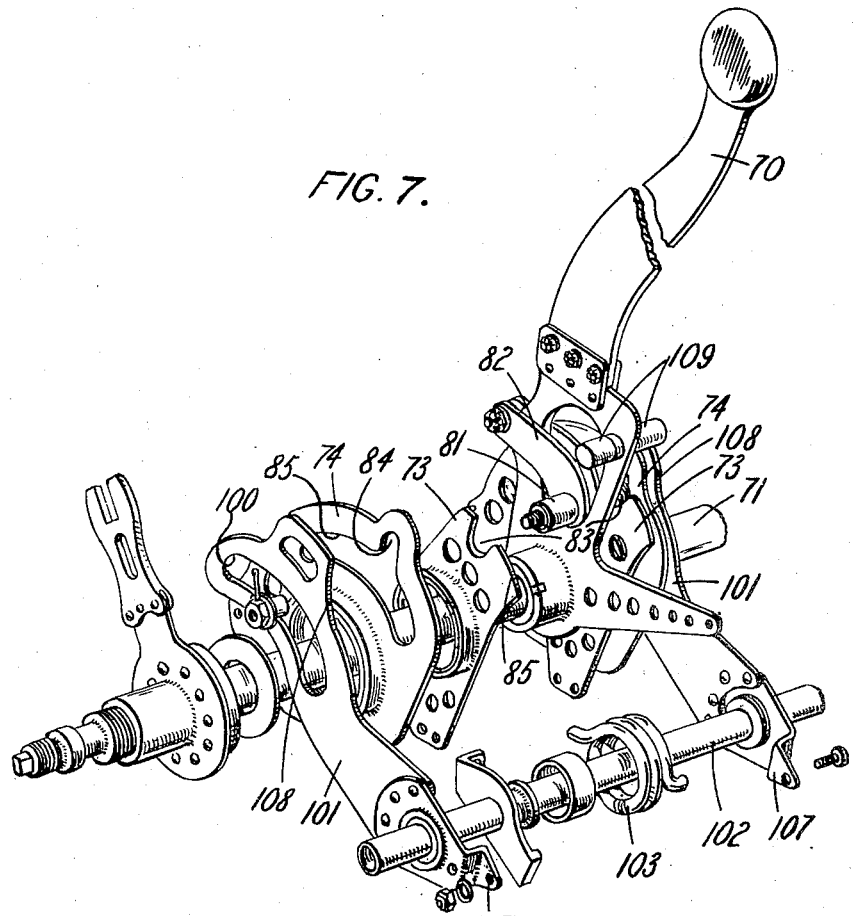
Figure 7 is an exploded perspective view of part of the system.

Referring to the drawings, the multi-unit system comprises a speed control lever 70 for each unit, the four levers being mounted side-by-side so as to turn about a common primary shaft 71 and being guided in straight slots in a quadrant plate 72 so as to move from a ground idling setting in ahead pitch at one end (the right hand end in Figure 1) to a maximum speed setting in positive pitch at the other. Between the extreme settings, each lever 70 has a reverse initiating setting, later more fully described, from which it can be moved towards the maximum speed setting into a higher speed range, or towards the ground idling setting into a lower speed range. At its pivoted end, each lever 70 is sandwiched between a pair of plate assemblies, one assembly of two inner plates 73 (see particularly Figure 3) and the other assembly of two outer plates 74, all mounted to turn about the axis of the primary shaft 71. The plates 73, 74 of each plate assembly are clamped together by bolts 75 which pass through spacing members 76, 77 arranged at a suitable part of their peripheries and also constituting projecting lever arms 79, 80, of which arm 79 is carried by plates 73 and arm 80 by plates 74.

The inner and outer plate assemblies are arranged to be alternatively coupled to their associated speed control lever 70, this being achieved by a roller 81, carried by a swinging link 82 pivoted to the speed control lever 70 and moving from a driving slot 83 in the inner plate assembly to a driving slot 84 in the outer plate assembly, these slots 83, 84 projecting respectively inwardly and outwardly from equal radius arcuate edges 85 on the plates 73, 74.

Figure 9:
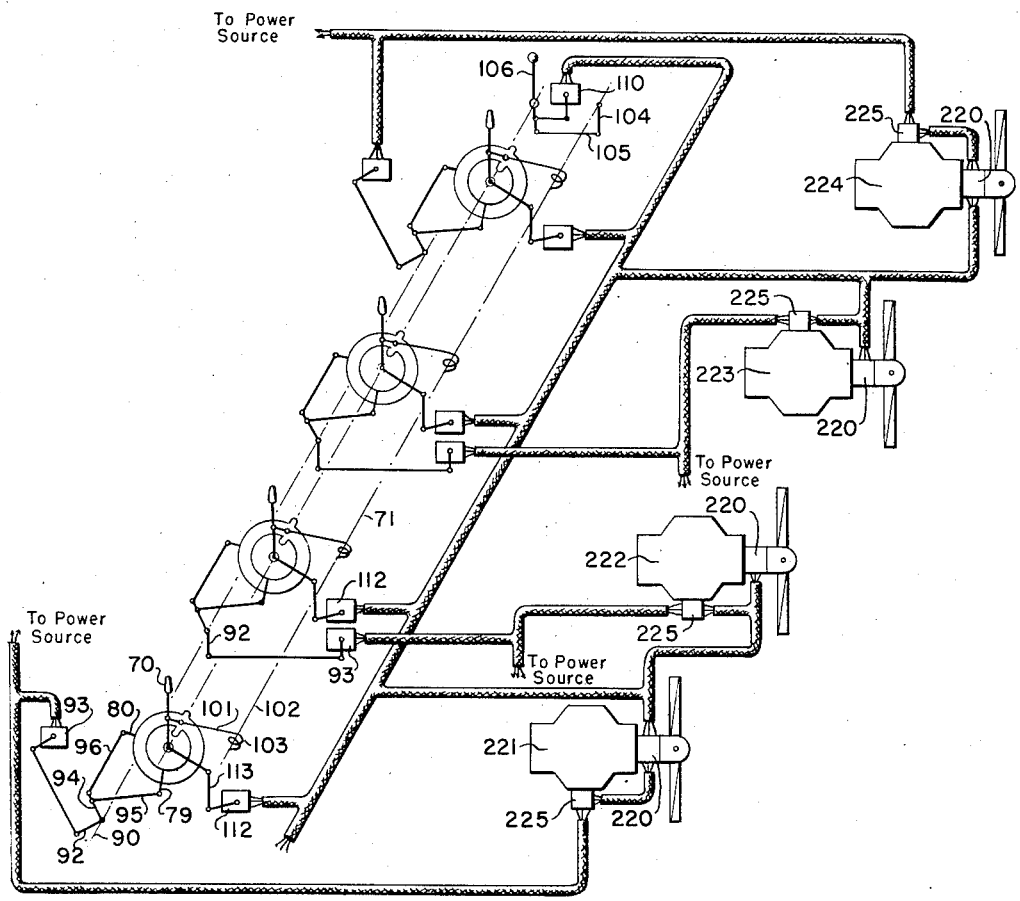
Figure 9 shows diagrammatically the control system as applied for the control of the four propulsion units.

A secondary shaft 90 is arranged parallel to and spaced from the primary shaft and carries four two-armed speed control bell crank levers, generally indicated at 91, one arm 92 of each of which is linked to a selsyn transmitter unit 93 electrically connected with a corresponding receiver unit 220 associated with one of the engine units 221, 222, 223 and 224 (see Figure 9) for speed control of the latter. Each transmitter unit 93 is connected with its associated receiver unit through an engine throttle (power) control unit 225, there being one such unit for each engine. The power control unit and the speed control unit of each engine unit are correlated in well known manner by means of the electrical connections between them. The other arm 94 of each lever 91 is connected by two separate links 95, 96 respectively to the lever arms 79, 80 pertaining to its associated speed control lever 70, these arms lying on opposite sides of the pair of planes containing the axis of shaft 71 and the axes of the pivot connections of the links 95, 96 to the lever 91 so that the latter turns in the one or the other direction according to whether the roller 81 is engaged in slot 83 or 84. Associated with each lever 91, to indicate a flight idling setting thereof, is a spring-pressed detent in the form of a ball-catch 97 which is carried by a fixed support and which enters a recess (not shown) in a quadrant 98 fixedly carried by the lever 91, when the latter is in its setting corresponding to the flight idling setting of the lever 70 in which setting the lever 70 is shown in Figure 1. This setting is in the higher speed range immediately adjacent to the reverse initiating setting of the lever. The detent 97 makes the flight idling setting of the lever 70 readily apparent to the pilot operating the controls, since a sensibly greater effort is required on his part to move the lever when it is in its flight idling position. Assuming a particular lever 91 to be in the setting corresponding to flight idling, the arrangement of the links 95, 96 is such that the slots 83, 84 are about to come into alignment with one another (as shown in Figure 1) and will do so as soon as movement is made through the reverse initiating setting, into the lower speed range. The roller 81 will then be free to change over from the slot 83 to the slot 84, such changing over having the effect that the movement of the lever 70 in the lower speed range instead of producing a reduction of speed will then produce an increase of speed, or vice versa. The moving over of the rollers 81 is controlled in the following manner. The two ends of each roller extending beyond the outer plate assembly project into arcuate slots 100 in a pair of plates 101 joined together as at 107 (see Figure 7) and journalled upon a tertiary shaft 102 arranged parallel to the primary shaft 71, the arcuate slots 100 being approximately concentric with respect to the primary shaft throughout the movement of the roller 81 from one driving slot 83 or 84 to the other. Each pair of plates 101 constitutes a reversing lever by which the corresponding roller is urged radially outwardly or inwardly, each reversing lever being connected by a torsion spring 103 to the shaft 102 and the latter being provided at one end with a lever arm 104 which is connected by a link 105 to a separate manual control comprising a reverse selection lever 106 journalled on the shaft 71 to one side of the four speed control levers 70. When the reverse selection lever 106 is in its inoperative or "off" position (normal ahead propulsion) the torsion springs 103 are loaded to urge the plates 101 towards the axis of the shaft 71 to maintain the rollers 81 in the slots 83 of the inner plate assemblies, and operation of any speed control lever operates the corresponding selsyn transmitter unit in the normal manner, that is to say forward movement of the lever gives increased speed in positive pitch and rearward movement of the lever gives decreased speed in positive pitch. When, however, the reverse selection lever 106 is moved to its reverse selecting position, the torsion springs 103 are loaded to urge the rollers 81 radially outwards away from the primary shaft axis. No roller can, however, leave the slot 83 of its inner plate assembly and enter that of the outer assembly until the slots 83, 84 are brought into alignment with one another and the lever 70 moved rearwardly through its reverse initiating position as hereinafter explained. When this happens, the transmitter becomes driven by the outer instead of the inner plate assembly so that its direction of movement is reversed and the unit speeds up instead of slowing down as previously described. To ensure that when a speed control lever 70 is moved forwardly again to the flight idling setting its roller 81 will return into the slot 83 for normal ahead speed response, each reversing lever is provided with a cam surface 108 which is engaged by a roller 109 carried by the speed control lever 70 to turn the reversing lever against the torsion spring 103 as the slots 83, 84 come into alignment. When a lever 70 is moved back to its reverse initiating position, therefore, the roller 81 is pushed into the slot 83 by the roller 109 and in view of this, it will be clear that the roller 81 cannot move outwardly again until the speed control lever is moved rearwardly through its reverse initiating setting as stated above.

The pitch reversal mechanism of the propellers is controlled electrically in the following manner. Operation of each reversal mechanism is dependent upon two propeller pitch reversal initiating means, in this case, the simultaneous closing of two electrical switches which are wired in circuit with the electrical control means so that the circuit is complete only when both switches are closed. One of these switches, switch 110, is common to all the propulsion units and is operated by the reverse selection lever 106 through a link 111 so as to be closed in the reverse selecting position of the lever 106. The remaining switches 112, one for each unit, are operated automatically by the respective speed control levers 70 through a link 113 so as to be closed when the levers are in their reverse initiating settings. Movement of the levers from their reverse initiating settings into their lower speed ranges opens the switches 112, but reversed pitch, once obtained for any particular propeller, is held by a holding circuit until the corresponding lever 70 is moved back through its reverse initiating setting to its flight idling position when returning means in the form of an electrical switch is operated to break the holding circuit Breaking of the holding circuit is arranged to cause the propeller to return automatically to positive pitch.

Figure 8:
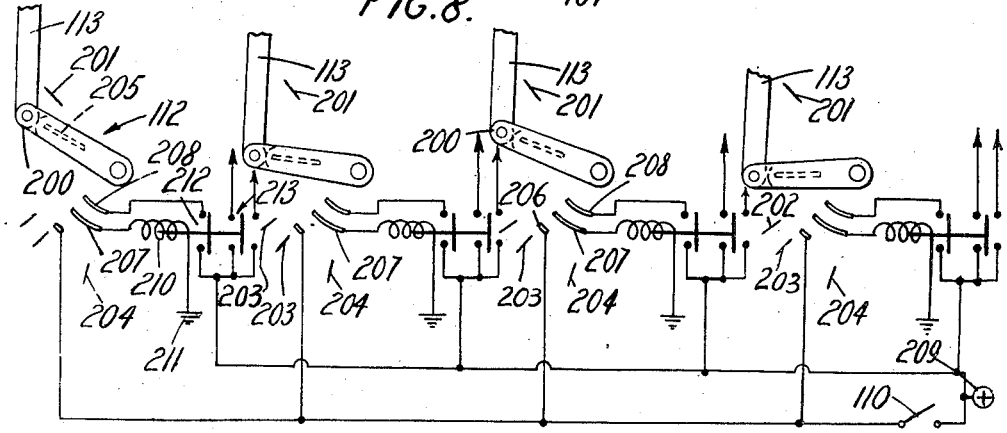
Fig. 8 is a wiring diagram.

The electrical circuits controlling the pitch reversal mechanism are shown in Figure 8. Each switch 112 includes an external operating lever 200 movable through an arc from a full speed ahead position 201 through a flight idling position 202 and a reverse initiating position 203 to a position 204 which corresponds either to ground idling speed in positive pitch or maximum speed in reverse pitch. Inside the switch there is a lever or disc moved by the lever 200 and carrying a contact 205 adapted to bridge fixed contacts 206, 207 and 208. The contact 206 is at the reverse initiating position, while the contacts 207 and 208 extend from this position to the ground idling position 204. To preselect reverse pitch the switch 110 is closed by operating the lever 106 (Figure 1). When the lever 200 is moved from the flight idling position 202 into the reverse initiating position 203 a circuit is established through reverse initiating means comprising the circuit from source 209, through switch 110, contacts 206, 205, 207 relay coil 210 to earth at 211. Relay contacts 212 and 213 are accordingly closed, the former establishing a holding circuit through contacts 208, 205, 207, 209, 212, 210 and 211 and the latter serving to energize the reversing mechanism of the propeller. Moving of the lever 200 beyond the reverse initiating position 203 breaks contact at 206 but the relay remains energized through the holding circuit. Closing the switch 110 by moving the reverse selection lever 106 to its reverse selecting position when the lever 200 is between the reverse initiating position 203 and the ground idling position 204 does not energize the relay, and does not, therefore, energize the pitch reversing mechanism. When the lever 200 is moved back by the lever 113 connected to the lever 70 through its reverse initiating position 203 to its flight idling position 202, the holding circuit is broken at contacts 207, 208, and the relay coil 210 is de-energized so that contacts 212 and 213 are opened, the latter thereby de-energizing the reversing mechanism of the propeller so that the propeller returns to positive pitch. Members 113 and 200 comprise hold-breaking means. The pitch reversing mechanism of each propeller is described in United States Patent No. 2,600,017. In that patent the two-way reversing switch 41, which is operated by the power control lever 17 when the lever is moved through the gate 25, corresponds to the switch comprising the contacts 213.

A small time interval is required for pitch reversal, so that in operation it is desirable to pause at the reverse initiation setting, until signal lamps showing that reverse pitch has been obtained light up.

To facilitate operation in this way, and to prevent inadvertent movement of the levers 70 to settings in their lower speed ranges when reverse pitch has been selected, movement of the reverse selection lever 106 to its reverse selecting position is arranged to move a set of ramps such as 115 into the paths of resilient detents 116 carried by the four assemblies of plates 74 so that rearward movement of the speed control levers 70 from the reverse initiation setting requires the exertion of additional effort by the pilot. The ramps 115, one for each lever 70, are fixedly carried on a fourth shaft 220 which is arranged parallel to the shaft 71 and which also carries a lever 221 coupled to the reverse selection lever 106 by a link 222 so that movement of the lever 106 to its reverse selecting position rotates the shaft 220 to bring each ramp 115 into the path of a detent 116 carried by the plates 74 associated with particular lever 70 as mentioned above. The detent engages the ramp when the lever 70 is moved rearwardly from its reverse initiating setting if reverse pitch has previously been selected by movement of the lever 106 and in mounting the steep face 223 of the ramp the detent is forced to compress a coiled spring urging it to its projected position as shown in Figure 1. The compression of this spring provides for the additional effort required of the pilot to move the lever 70 rearwardly from its reverse initiation setting as mentioned above. Pitch changing from reverse to positive pitch proceeds more rapidly and no corresponding pause is necessary in this case.

Adjacent the four speed control levers 70 is arranged a manual locking control comprising a locking lever 117 for locking the flying controls of the aircraft. The locking lever is mounted on a pivot 120 adjacent the shaft 71 and has a bell crank arm 121 connected by a link 122 to one arm 123 of a two-armed lever 124 fixed to the secondary shaft 90. The other arm of lever 124 is connected by a further link 125 to the control member of the locking system, which in a particular instance comprises a series of hydraulic jacks which centralise the aerodynamic control surfaces and lock them in the centralised positions. Journalled on the shaft 90 between outer pairs of the speed control bell crank levers 91, are two further short-armed or inter locking bell crank levers 128 which are rigidly connected together by a crank pin 129 extending from an arm 130 of one to an arm 130 of the other so that the levers 128 turn together about the secondary shaft 90. At its middle, opposite a space between the central speed control bell crank levers 91, the crank pin 129, is provided with an abutment 132 extending inwardly towards the secondary shaft. The inwardly projecting abutment is arranged to co-operate with an abutment 133 fixed to the secondary shaft between the central bell crank levers 91 the arrangement being such that when the secondary shaft is turned by moving the locking lever 117 into the controls-locked position the abutments 132, 133 engage to turn the inter locking bell crank levers 128 into a position in which their arms 134 lie between the paths of faces 135 on the speed control bell crank levers. Each arm 134 carries an interlock device which consists of a pin 140 with rounded ends mounted in a cage 141 containing a pair of centralising springs 142 acting on a collar 143 on the pin. The pins 140 lie parallel to the shaft 90 and are of greater length than the spacing of the faces 135 between which they are situated, so that both speed control bell crank levers 91 of a pair cannot be moved simultaneously past the pin 140 but either bell crank alone can pass the pin, the latter then being displaced axially against one of the centralising springs 143. The interlock device is arranged to become effective at the flight idling setting of the speed control bell crank levers 91 and it will be understood that the effect of this device is to enable any one engine, or any two engines on opposite sides of the aircraft, to be run up to maximum speed for ground testing purposes while the flying controls are locked, but that the attainment of maximum speed of a sufficient number of engines to permit of the aircraft taking off is prevented.

In Figure 4, the levers 91 are shown in their flight idling positions with the pins 140 swung partially away from their locking positions. In their locking positions, the pins 140 would rest on the faces 135 in Figure 4.

To ensure that the interlock system is not put out of action until the flying controls are effectively unlocked the bell crank levers 128 are maintained in their locked position by an electromagnetically retractable detent 144 which engages under an abutment 145 projecting outwardly from the crank pin 129 and which is arranged to be energised when a circuit is completed through a series of switches, one pertaining to each control lock jack and closed only when the jack returns to its fully released setting. When the detent 144 is retracted the interlock bell crank levers 128 are rotated about the secondary shaft 90 to an inoperative position by a spring 150.

We claim:

1. A speed control system for a propulsion unit having a reversible pitch propeller including pitch reversal mechanism, said speed control system comprising a speed control lever having a reverse initiating setting corresponding to an intermediate speed of the unit in positive pitch and mounted for movement from said reverse initiating setting in one direction into a higher speed range in positive pitch and in the other direction into a lower speed range in positive pitch, two means cooperating with one another to effect the pitch reversal of the propeller, one of said propeller pitch reversal means being operatively connected to said speed control lever so that when the lever is in its reverse initiating setting said one means becomes automatically operative, a separate manual control mounted for movement to a reverse selecting position operatively connected to the other of said means for causing operation of said other means when the control is moved to its reverse selecting position, reverse pitch holding means for holding the reverse pitch of the propeller once obtained, hold-breaking means comprising the operative connection between said one of said propeller pitch reversal means and said speed control lever so as to break the hold of said reverse pitch holding means when said speed control lever is moved out of said lower speed range, and speed control reversing means operatively connected to said separate manual control and rendered effective by said seperate manual control on movement to its said reverse selecting position to reverse the action of said speed control lever on the unit when the speed control lever is moved from its reverse initiating setting to a position in said lower speed range so that the speed of the unit is increased instead of being reduced.

2. A control system as claimed in claim 1, wherein the speed control lever is pivoted to turn about a primary shaft, and wherein the system further comprises a secondary shaft parallel with said primary shaft, a lever on said secondary shaft, which lever is coupled to means controlling the speed of the propulsion unit so that pivotal movement of the lever about the secondary shaft axis in one direction adjusts said speed control means to reduce the speed of the propulsion unit, and is also coupled separately to each of a pair of members carried to turn about said primary shaft axis, so that movement of one of the members about the primary shaft axis moves said secondary shaft lever in a corresponding direction to increase or decrease the speed of the unit, and movement of the other of said members about said primary shaft axis moves said secondary shaft lever in the opposite direction to decrease or increase the speed of the unit, coupling means selectively to couple said speed control lever with said first or second member so that the first or second member rotates about said primary shaft axis with said speed control lever when said speed control lever is moved, said coupling means being under the control of said speed control reversing means.

3. A speed control system as claimed in claim 2 comprising a spring pressed detent carried by a fixed support adjacent said secondary shaft, said detent being so arranged as to enter a recess in a quadrant fixedly carried by said secondary shaft lever when the speed control lever is in a second intermediate setting, and preventing the speed control lever being moved from its second intermediate setting except by an effort which is sensibly greater than the effort normally required to move the speed control lever when it is in some other setting in said higher or lower speed range, said second intermediate setting of the speed control lever being in said higher speed range immediately adjacent said reverse initiating setting, and corresponding to the operational idling speed of the unit.

4. A control system as claimed in claim 2, wherein said members each comprise a plate assembly having a pair of plates arranged one on each side of said speed control lever, the speed control lever being sandwiched between the pair of plates of one of the plate assemblies and each of these plates having on its side remote from the speed control lever one of the plates of the other plate assembly, and said coupling means comprises a roller carried by said speed control lever and arranged to enter an outwardly directed slot in one plate assembly or an inwardly directed slot in the other plate assembly, said slots projecting from equally radiused arcuate edges on the plate assemblies which are centered on said primary shaft axis, and said slots are positioned relatively to one another such that the slots are aligned to allow the transfer of the roller from one to the other when said speed control lever is in its reverse initiating setting.

5. A control system as claimed in claim 4, wherein said secondary shaft lever comprises a speed control bell crank lever one arm of which is separately coupled to each of said plate assemblies by means of a connecting link, the lines of action of said connecting links lying one on each side of the pair of planes containing the primary shaft axis and the axes of the pivot connections of the links with the bell crank lever arm.

6. A control system as claimed in claim 5, wherein said speed control reversing means comprises a tertiary shaft parallel with said primary shaft, a reversing lever pivoted for movement about said tertiary shaft axis and having an arcuate slot spaced from the tertiary shaft in which said roller engages, said slotted lever being urged towards said primary shaft by a torsion spring carried by said tertiary shaft and holding the roller in said inwardly directed slot when said speed control reversing means is non-effective.

7. A control system as claimed in claim 6 wherein said separate manual control comprises a manual reverse selecting lever journalled on said primary shaft, and said tertiary shaft is provided with a lever arm connected by a link to said reverse selecting lever so that movement of said reverse selecting lever to its reverse selecting position rotates said tertiary shaft to load the torsion spring to urge said reversing lever away from said primary shaft so that said roller is carried into said outwardly directed slot when the said inwardly and outwardly directed slots come into alignment.

8. A control system as claimed in claim 6, wherein a cam surface is provided on said reversing lever and a cam follower on said speed control lever, the cam follower being arranged to engage said cam surface and turn said reversing lever against the action of the torsion spring, to carry said roller into the inwardly directed slot when said speed control lever is moved back to its reverse initiating position from a setting in its lower speed range.

9. A control system for at least two propulsion units, said control system comprising in combination a control system for each unit as claimed in claim 5 and a manual locking control for locking directional control devices pertaining to a vehicle which the units are intended to propel, said manual locking control being arranged, when moved to a controls locked position, to interpose an interlocking device in the paths of faces on the arms of the speed control bell crank levers coupled to each of the plate assemblies pertaining to the speed control levers of the speed control systems pertaining to the propulsion units, the interlocking device being effective to prevent movement of the speed control levers simultaneously to a setting above a setting corresponding to a predetermined speed of each unit, but allowing movement of any speed control lever singly to such a setting, said speed control bell crank levers being mounted on a common secondary shaft, and said manual locking control operating through a two armed lever carried by said common secondary shaft to interpose said interlocking device in the paths of said faces.

10. A control system as claimed in claim 9, wherein an interlocking device is carried towards the free end of one arm of an interlocking bell crank lever which is mounted for rotation on said common secondary shaft between a pair of said speed control bell crank levers, and said interlocking device comprises a pin with rounded ends which is mounted in a cage containing a pair of centralising springs acting on a collar on the pin, the pin normally projecting from each end of the case and lying parallel with said secondary shaft axis, the pin being longer than the gap between the faces on said pair of speed control bell crank levers, and wherein the secondary shaft carries an abutment which is arranged to engage an abutment carried by the other arm of the interlocking bell crank lever when the manual locking control is moved to its controls locked position to move the interlocking bell crank lever to an operative position in which the pin lies in the path of said faces so that only one or the other of said pair of speed control bell crank levers may be moved beyond the pin.

11. A control system as claimed in claim 10 wherein said interlocking bell crank lever is spring-urged away from its operative position, and an electrically withdrawable detent is provided to engage another abutment carried from said other arm of the interlocking bell crank lever to hold the bell crank lever in its operative position while the directional controls are locked.

12. A control system as claimed in claim 1 wherein the pitch reversal mechanism of the propeller is controlled by electrical control means, and wherein said two propeller pitch reversal initiating means comprises a pair of electric switches in circuit with said electrical control means said switches being arranged so that the circuit of said electrical means is completed when both the switches are closed, and wherein one of said switches is arranged for closure by said separate manual control when said separate manual control is moved to its reverse selecting position and the other of said switches is arranged for closure by said speed control lever when said speed control lever is moved to its reverse initiating setting.

13. A control system as claimed in claim 1, further comprising means which become effective on said speed control lever, when said speed control lever is in its reverse initiating setting and said separate manual control is in its reverse selecting position, to prevent inadvertent movement of the speed control lever to a setting in said lower speed range.

14. A control system as claimed in claim 13, wherein said inadvertent movement preventing means is operatively connected to said separate manual control so as to be set for action when said separate manual control is moved to its reverse selecting position.

15. A control system as claimed in claim 14, wherein said inadvertent movement preventing means comprises a ramp which is moved by said separate manual control into the path of a resilient detent on a part movable with the speed control lever to increase the speed of the unit when reverse pitch has been obtained when said separate manual control is moved to its reverse selecting position, said ramp resisting the movement of said part in a direction to increase the speed of the unit so that additional effort is required to move the speed control lever to a setting in the lower speed range.

16. A control system for at least two propulsion units, said control system comprising in combination a control system for each unit as claimed in claim 1, and a manual locking control for locking directional control devices pertaining to a vehicle which the units are intended to propel, said manual locking control being arranged, when moved to a controls locked position, to interposed an interlocking device in the paths of parts moved by the speed control levers of the speed control systems pertaining to the propulsion units, which interlocking device is effective to prevent movement of the speed control levers simultaneously to a setting above a setting corresponding to a predetermined speed of each unit, but allowing movement of any speed control lever singly to such a setting.

17. A control system as claimed in claim 1, further comprising means operatively connected to said speed control lever indicating a second intermediate setting of the speed control lever, said second intermediate setting being in said higher speed range immediately adjacent said reverse initiating setting, and corresponding to the operational idling speed of the unit.

References Cited in the file of this patent

UNITED STATES PATENTS

| | | |
|---|---|---|
| 2,664,959 | Stuart | Jan. 5, 1954 |
| 2,678,103 | Martin et al. | May 11, 1954 |